United States Patent [19]
Cosser

[11] Patent Number: 5,304,985
[45] Date of Patent: Apr. 19, 1994

[54] HIGH PRESSURE, HIGH TEMPERATURE SEALING ARRANGEMENT

[76] Inventor: Harry F. Cosser, 16 Tavistock Road, Fleet, Hampshire, United Kingdom, GU13 8EH

[21] Appl. No.: 869,504

[22] Filed: Apr. 16, 1992

[30] Foreign Application Priority Data

Apr. 17, 1991 [GB] United Kingdom ............... 9108148

[51] Int. Cl.⁵ .......................................... G08B 21/00
[52] U.S. Cl. ................................. 340/620; 340/618; 174/151; 73/304 R
[58] Field of Search ............... 340/618, 620, 603; 174/11 R, 18, 151; 73/304 R, 290 R; 137/551, 558; 200/61.04, 61.05

[56] References Cited

U.S. PATENT DOCUMENTS 1,911,756 5/1933 Gunderson .................. 340/620 X
3,158,682 11/1964 Goellner ......................... 174/151

FOREIGN PATENT DOCUMENTS 734473 5/1980 U.S.S.R. .
830062 5/1981 U.S.S.R. .

Primary Examiner—Jeffery A. Hofsass
Attorney, Agent, or Firm—Nixon & Vanderhye

[57] ABSTRACT

A water level sensing probe which comprises a central electrode encircled by a tubular ceramic insulator which is held between an integral laterally projecting portion of the electrode, which forms a conductive tip, and a tubular metal mounting body which surrounds and is displaced from the electrode that passes through it. The ceramic insulator is taper locked within the conductive tip at one end and within the tubular metal mounting body at the other end.

11 Claims, 1 Drawing Sheet

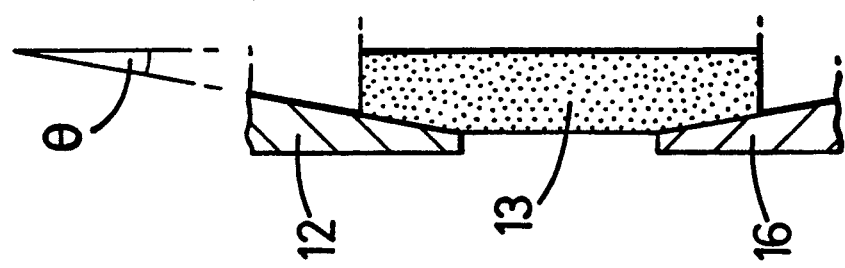
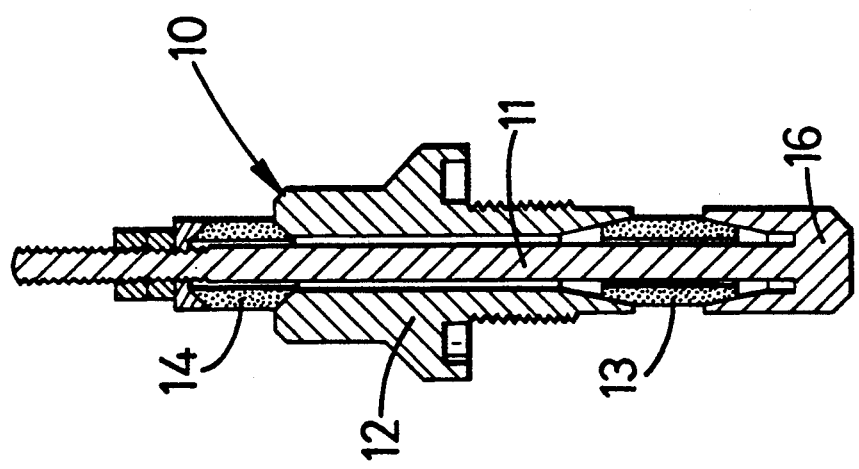
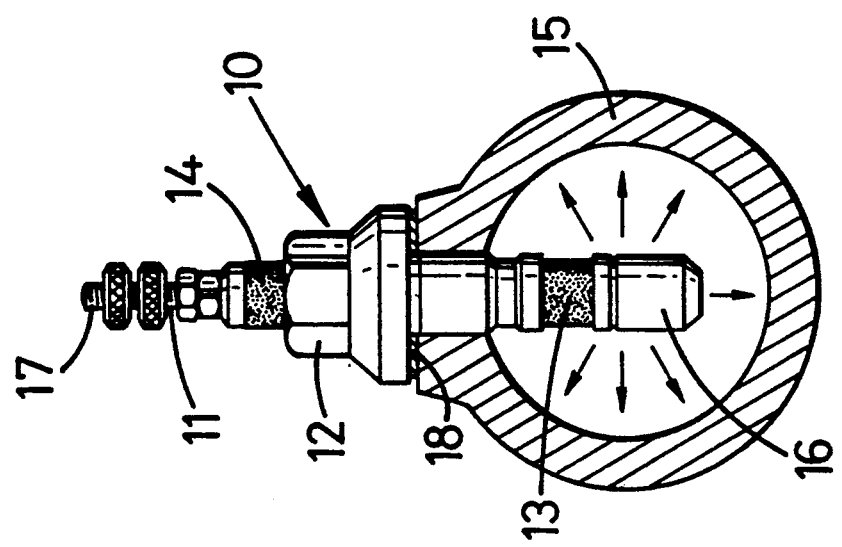

HIGH PRESSURE, HIGH TEMPERATURE SEALING ARRANGEMENT

DESCRIPTION

This invention relates to a high pressure, high temperature sealing arrangement for use in high pressure steam apparatus between a ceramic component and a metal component.

Although a sight glass is a mandatory requirement in boilers for enabling an assessment of water level, over the past decade a system using a multiplicity of probes inserted in a vertical side arm vessel attached to the boiler, the probe being connected to an electronic discrimination circuitry, has been applied to achieve reliable level indication at remote locations. GB-A-1056032 describes such a system in which each probe comprises a central electrode encircled by a tubular ceramic insulator which is held in a metal body which is screwed into the side of the vessel. The system utilises the significant difference between the resistivity of the water and of the steam which fills the space in the vessel above the water, to indicate whether each probe is immersed in steam or in water and thus to indicate the level of the water.

Single probe arrangements have also been used to detect the presence of water in steam lines at critical locations, providing a reliable and more maintenance free replacement for mechanically operated float-switches. GB-A-1056032 describes the material of the central electrode and of the metal body as being chosen so that its coefficient of thermal expension matches that of the ceramic over a wide temperature range. That forces use of exotic materials which are expensive and which are necessary to ensure a god steam-tight seal is maintained between the ceramic insulator and the metal components it is held between.

Amongst various other seal arrangements which have been used, there is compression of a soft metal shim or other resilient material at the interface between the ceramic and metal components, with the compression force retained by stud tension. U.S. Pat. No. 3,158,682 discloses such an arrangement in which a soft metal gasket washer is used at either end of a tubular ceramic insulator to provide a seal between the insulator and a mounting body at one end of the insulator and between the insulator and a coupling nut at the other end of the insulator. Each of the washers has an internal frusto-conical surface which mates with a complementary frusto-conical surface which is formed on the exterior of the insulator at the respective end of that insulator. During assembly of a probe which is to embody the sealing arrangement, a sub-assembly comprising the mounting body, the insulator and the coupling nut are assembled with a central rod screwed into the coupling nut and passing, with clearance, through the bore of the tubular insulator and through an aligned bore in the mounting body. The sub-assembly is then placed in an arbor press and compressed longitudinally. This compresses and coins the material of the gasket washers against the insulator to form a good gas-tight seal. A nut is tightened on the end of the central rod that projects from the bore in the mounting body, thereby entrapping another tubular insulator known as a standoff insulator, between itself and the mounting body. Thus the assembly is held against the component parts working loose, by the resultant tension in the central rod. This method suffers from the limitation that there are two possible leakage paths at each interface, i.e. either side of the shim, gasket washer or resilient material, and the tension in the stud or central rod can be reduced by thermal relaxation of the stud or central rod due to temperature cycling. Another of the sealing arrangements that have been used involves direct compression between a small contact area on the metal part, such as is formed by a sharp edge, and the ceramic to achieve a high seating stress, again retained by stud tension with consequent thermal relaxation problems as just discussed.

A further known method comprises reactive brazing between titanium metal parts and the ceramic using a silver based alloy, or brazing between stainless steel and ceramic using a brazing alloy containing titanium. This is an expensive time consuming process which also requires a large capital investment for vacuum brazing equipment so that contamination of brazing surfaces is avoided. This process also requires experienced operators as minute changes in the composition of the materials has a significant bearing on the required furnace temperature and time profile to achieve an acceptable pressure sealing braze.

Induction brazing techniques have been used but production yields are low due to excessive thermal shock effects inducing cracks in the ceramic, and metal parts require post braze deoxidisation to present an acceptable appearance.

An object of this invention is to provide a high pressure, high temperature sealing arrangement which enables the use of cheaper, commercially available materials for a central electrode and a metal body and which permit a good steam-tight seal to be maintained between a ceramic insulator and the metal components.

According to this invention there is provided a high pressure, high temperature sealing arrangement for use in high pressure steam apparatus at an interface between a ceramic component and a metal component, wherein the ceramic component has a shallow external taper formed on it and is force fitted into a cavity in the metal component which is formed with a complementary taper such that there is an elastic strain of the metal component on assembly and the ceramic component is locked within the cavity of the metal component by inter-engaged tapered surfaces, the angle of taper being less than the angle of friction between the interengaged tapered ceramic and metal surfaces, the force fit being such as to cause sufficient elastic strain of the metal components on assembly for the ceramic component to remain locked therein at the designed high operating temperature despite the thermal expansion of the metal component being greater than that of the ceramic component.

The high pressure, high temperature sealing arrangement is preferably incorporated in a water level sensing probe which comprises a central electrode encircled by a tubular ceramic insulator which is held between an integral laterally projecting portion of the electrode and a mounting body which surrounds and is displaced from the electrode that passes through it, the high pressure, high temperature sealing arrangement being at the interface at either end of the ceramic component and the metal body and the lateral projection.

In practice it is desirable to provide the tapered surfaces on the ceramic insulator with a smooth surface finish in order to avoid longitudinal gouging which would occur when compressing the bodies onto the insulator if the tapered surfaces were not sufficiently smooth and which would result in poor sealing performance.

One form of high pressure, high temperature sealing arrangement in which this invention is embodied, is described now by way of example and with reference to the accompanying drawings, of which:

FIG. 1 is a transverse cross-section of a pressure vessel of high pressure steam apparatus with a water level sensing probe therein, the probe incorporating a sealing arrangement in which this invention is embodied.

FIG. 2a is a sectioned view of the probe shown in FIG. 1; and

FIG. 2b is a fragment of FIG. 2a drawn to a larger scale.

FIGS. 1, 2a and 2b show a probe 10 which comprises a central electrode 11 which is encircled by a shorter tubular body 12. The electrode 11 extends from the ends of the body 12 from which it is supported at either end by a respective tubular ceramic insulator 13, 14. The tubular body 12 is screwed into the side of a pressure vessel 15 so that the probe 10 projects into the interior of the vessel 15. The electrode 11 has an integral cup-shaped conductive tip 16 at its end within the vessel 15. The cylindrical wall of the tip 16 extends back towards the body 12 and surrounds the adjacent portion of the electrode 11 from which it is spaced. The end of the tubular insulator 13 remote from the tubular body 12 is supported by the cylindrical wall of the tip 16.

The end of the electrode 11 outside the pressure vessel 15 is formed as a terminal 17 by which the probe 10 is connected into the electonic discrimination circuitry which is not shown. A gasket 18 is trapped between the body 12 and the pressure vessel 15 to provide a pressure-tight seal between the probe 10 and the vessel 15.

The relationship between the dimensions of the conductive tip 16 and the inside diameter of the vessel 15, which is formed of an electrically conductive material, defines a constant "K" so that the resistance detected by the electronic discrimination circuitry is given by $R = \phi \cdot K$ where $\phi$ is the resistivity of the medium interposed between the probe 10 and the vessel 15.

This invention is concerned with the formation of the necessary high pressure, high temperature sealing arrangement that must be provided at the interface between the ceramic insulator 13 and the metal components at either end of it, namely, the conductive tip 16 and tubular body 12. The sealing arrangement must withstand pressures in excess of 40 bar and temperatures in excess of 250° C.

FIGS. 2a and 2b show that the portion of the inner surface of both the tubular body 12 and the cylindrical wall of the conductive tip 16 at the respective interface with the tubular ceramic insulator 13 is frusto-conical, the angle of taper $\theta$ being small, and the outer surface of the tubular ceramic insulator 13 is tapered at either end with a complementary angle of taper. The conductive tip 16, the tubular ceramic insulator 13 and the tubular metal body 10 were forced together on assembly so that a controlled elastic deformation was caused in the metal components 12 and 16. That was because the compressive strength of the ceramic material is at least 5 times that of the steel from which the components 12 and 16 were made. The resultant radial stress at the interfaces between the ceramic insulator 13 and the metal components 12 and 16, together with the frictional effects of the mating ceramic and metal surfaces, resulted in the ceramic insulator 13 being locked within the tapered aperture at either end formed by the respective metal component 12, 16, providing the angle $\theta$ was less than the angle of friction $\beta$. If $\mu$ is the coefficient of friction between the metal and ceramic faces, $\beta = \text{Tan}^{-1} \mu$. As a result the assembly of the conductive tip 16, the tubular ceramic insulator 13 and the tubular body 12 are held locked together. Also the use of the small angle $\theta$ results in the components being aligned concentrically more accurately. The amount of the controlled elastic deformation that was caused on assembly was chosen so that it exceeded that due to the possible relaxation in the forces acting to hold the ceramic insulator 13 taper-locked within the conductive tip 16 and the body 12 due to the differences in the coefficience of thermal expansion of the metal and ceramic parts so that an effective high pressure seal is maintained between those parts up to the upper limit of the specified range of temperatures for which the apparatus is designed to be used. That avoids the need to use more exotic metals, which are generally not available, and which have a coefficient of thermal expansion which matches the coefficient of thermal expansion of the ceramic.

In order to counter any risk of temperature cycling causing undesirable thermal relaxation of the elastic deformation of the metal components 12 and 16 relative to the ceramic component 13 which may threaten the integrity of the high pressure seal between those components, the central electrode may be tensioned so that the tubular ceramic insulator 13 is subjected to additional compressive forces by the juxtaposed metal components 12 and 16 in reaction which reinforces the forces effecting the high pressure seal at the interfaces between that ceramic insulator 13 and the juxtaposed metal components 12 and 16. On the other hand, as the thermal relaxation effects are dependent on the applied stress, the extent to which the central electrode is tensioned should be kept to the minimum.

Of course the fluid pressure loading on the external surface of the conductive tip 16 exerted by the pressure within the vessel 15 will augment the compressive loads acting on the tubular ceramic insulator and thus augment the sealing forces. Any relaxation in the elastic deformation or strain of the metal components 12 and 16 due to differential thermal expansion, thermal relaxation or ageing will be compensated for automatically, due to the small angle of taper at the interface between the tubular ceramic insulator and the juxtaposed metal components 12 and 16, because the end force that acts on the central electrode 11 and the conductive tip 16 will urge the conductive tip 16 towards the tubular body 11, due to the differential fluid pressure loading therein, and thus will tend to urge the cylindrical wall of the conductive tip 16 towards the tubular body 12 with the result that either end of the ceramic insulator 13 will be forced further into the respective tapered cavity formed by the juxtaposed metal component 12, 16 at either end so that the seal is maintained automatically.

I claim:

1. In an electrical water level sensing probe comprising an end body, a mounting body having a through passage formed therein and which is to be mounted in a side of a pressure vessel so that the end body is within the pressure vessel, a tubular ceramic insulator by which the end body and the mounting body are interconnected, the interior of the tubular insulator communicating with the through passage, and a central electrode which is mounted on the end body and which extends through the interior of the tubular insulator and through the through passage of the mounting body with clearance therearound, there being a high pressure, high temperature sealing arrangement between the insulator and each of the end body and the mounting member, wherein the improvement comprises:

the tubular ceramic insulator having a shallow external taper formed on it at either end and being in direct contact with and force fitted into a respective cavity which is formed in the respective one of the end body and the mounting body that are interconnected by the tubular ceramic insulator, each cavity being formed with a complementary taper such that there is an elastic strain of the respective one of the end and mounting bodies on assembly and the ceramic insulator is locked within the cavity of the respective body by directly contacting and interengaged tapered surfaces, the force fit being such as to cause sufficient elastic strain of the material of the respective body on assembly for the ceramic insulator to remain locked therein at the designed high operating temperature despite the thermal expansion of the bodies being greater than that of the ceramic insulator.

2. In an electrical water level sensing probe comprising an end body, a mounting body having a through passage formed therein and which is to be mounted in a side of a pressure vessel so that the end body is within the pressure vessel, a tubular ceramic insulator by which the end body and the mounting body are interconnected, the interior of the tubular insulator communicating with the through passage, and a central electrode which is mounted on the end body and which extends through the interior of the tubular insulator and through the through passage of the mounting body with clearance therearound, there being a high pressure, high temperature sealing arrangement between the insulator and each of the end body and the mounting member, wherein the improvement comprises:

the tubular ceramic insulator having a shallow external tape formed on it at either end and being in direct contact with and force fitted into a respective cavity which is formed in the respective one of the end body and the mounting body that are interconnected by the tubular ceramic insulator, each cavity being formed with a complementary taper such there there is an elastic strain of the respective one of the end and mounting bodies on assembly and the ceramic insulator is locked within the cavity of the respective body by directly contacting and interengaged tapered surfaces, the angle of taper being less than the angle of friction between the interengaged tapered surfaces of the ceramic insulator and the bodies, the force fit being such as to cause sufficient elastic strain of the material of the respective body on assembly for the ceramic insulator to remain locked therein at the designed high operating temperature despite the thermal expansion of the bodies being greater than that of the ceramic insulator.

3. A high pressure, high temperature sealing arrangement for use in high pressure steam apparatus at an interface between a ceramic component and a metal component, wherein:

the ceramic component has a shallow external taper formed on it and is in direct contact with and force fitted into a cavity in the metal component which is formed with a complementary taper such that there is an elastic strain of the metal component on assembly and the ceramic component is locked within the cavity of the metal component by directly contacting and interengaged tapered surfaces, the angle of taper being less than the angle of friction between the interengaged tapered ceramic and metal surfaces, the force fit being such as to cause sufficient elastic strain of the metal components on assembly for the ceramic component to remain locked therein at the designed high operating temperature despite the thermal expansion of the metal component being greater than that of the ceramic component.

4. A high pressure, high temperature sealing arrangement according to claim 3 incorporated in a water level indicating probe which comprises:

a central electrode encircled by a tubular ceramic insulator which is held between an integral laterally projecting portion of the electrode providing a mounting body which surrounds and is displaced from the electrode that passes through it, the high pressure, high temperature sealing arrangement being at the interface at either end of the ceramic component and the metal body and the lateral projection.

5. A water level sensing probe according to claim 1, including tensioning means operable to tension the central electrode so that the ceramic insulator is subjected to additional compressive forces.

6. A water level sensing probe according to claim 2, including tensioning means operable to tension the central electrode so that the ceramic insulator is subjected to additional compressive forces.

7. A water level sensing probe according to claim 4, including tensioning means operable to tension the central electrode so that the ceramic insulator is subjected to additional compressive forces.

8. A high pressure, high temperature, mutually sealed three component metal-ceramic-metal structure for use in a high pressure steam and water environment, said structure comprising:

a first one-piece metal component having a cylindrical aperture with an internal conical taper;

a second one-piece metal component having a cylindrical aperture with a internal conical taper;

a one-piece cylindrical ceramic component having a smooth-surfaced external conical taper at each end thereof which is complementary to a respectively corresponding one of said internal conical tapers;

each externally tapered end of said ceramic component being directly engaged with and swaged into its respectively corresponding one of said internal complementary tapered apertures of the metal components, which metal aperture is thereby placed under permanent elastic strain; and the respective angles of taper of said components being less than the angle of friction between the interengaged ceramic and metal surfaces so as to maintain a sealed taper lock therebetween despite differences in thermal expansion between the ceramic and metal components.

9. A structure as in claim 8 wherein said first metal component has a closed end with an integral metal shaft extending therefrom through the aperture of the first metal component and also through central apertures formed within and through said ceramic component and said second metal component.

10. A structure as in claim 9 wherein said second metal component includes an external thread and a seal cavity for sealed attachment to a tapped aperture of a steam/water containing vessel.

11. A structure as in claim 9 wherein a free end of said integral metal shaft is threaded and includes a matingly threaded nut thereon in force bearing relationship against said second metal component so as to place said shaft in tension and thereby provide added compression force on the taper-locked metal-ceramic-metal seals.

* * * * *